United States Patent [19]

Barcza

[11] Patent Number: 5,511,376
[45] Date of Patent: Apr. 30, 1996

[54] AXISYMMETRIC VECTORING NOZZLE

[75] Inventor: William K. Barcza, Palm City, Fla.

[73] Assignee: United Technologies Corporation, Hartford, Conn.

[21] Appl. No.: 333,113

[22] Filed: Nov. 1, 1994

Related U.S. Application Data

[63] Continuation of Ser. No. 115,484, Aug. 31, 1993, abandoned.

[51] Int. Cl.⁶ .............................. F02K 1/12; B64C 15/02
[52] U.S. Cl. ...................... 60/230; 60/232; 239/265.35; 239/265.41
[58] Field of Search ........................... 60/228, 230, 232; 239/265.35, 265.41, 265.19

[56] References Cited

U.S. PATENT DOCUMENTS

| | | | |
|---|---|---|---|
| 3,979,065 | 9/1976 | Madden | 239/127.3 |
| 4,447,009 | 5/1984 | Wiley et al. | 239/265.39 |
| 4,994,660 | 2/1991 | Hauer | 239/265.41 |
| 5,082,182 | 1/1992 | Bruchez, Jr. et al. | 239/265.35 |
| 5,174,502 | 12/1992 | Lippmeier et al. | 60/228 |

Primary Examiner—Richard A. Bertsch
Assistant Examiner—William Wicker
Attorney, Agent, or Firm—Edward L. Kochey, Jr.

[57] ABSTRACT

A convergent/divergent nozzle (14) has five trains of flaps. Each train is comprised of an inboard (26) and outboard (20) convergent flap, an inboard (48) and outboard (44) divergent flap and an external flap (62). The five external flaps (62) maintain their symmetry while vectoring, whereby overlapping of adjacent flaps is obtained. The inboard and outboard convergent flaps are individually driven (32,36) by a common unison ring (28).

13 Claims, 4 Drawing Sheets

AXISYMMETRIC VECTORING NOZZLE

This is a continuation of Ser. No. 08/115,484, filed Aug. 31, 1993, now abandoned.

TECHNICAL FIELD

The invention relates to exhaust nozzles for aircraft gas turbine engines and in particular an arrangement for vectoring a variable convergent/divergent nozzle.

BACKGROUND OF THE INVENTION

Modern combat aircraft require the flexibility of being able to fly at either subsonic or supersonic speeds and also must be highly maneuverable. Particularly at supersonic speed it is desirable to have the exhaust nozzle in the form of a convergent/divergent nozzle. Furthermore for afterburning it is required that the nozzle be operable to increase the throat area.

Vectoring of the nozzle is also desirable to achieve yaw and pitch control of the aircraft. This is accomplished by manipulating the divergent portion of the nozzle to direct the exhaust gases an angle with the axis of flow through the nozzle.

Axisymmetric nozzles have tended to have in the order of fifteen to eighteen trains of flaps, and also fifteen to eighteen trains of seals. These nozzles have not been readily adaptable to use a lesser number which would achieve a lesser weight nozzle. With fewer flaps the circumferential loads being transferred around the periphery must be capable of passing around sharper corners. Also pressure loaded seals have been used between adjacent flaps. These depend on the internal pressure to maintain the seals in contact with the flaps. At the extreme angles between adjacent flaps existing with fewer flaps, the pressure loading is too extreme for dependable sliding seals.

SUMMARY OF THE INVENTION

An axisymmetric vectoring convergent/divergent nozzle for a gas turbine engine has a static structure for axial flow of gas therethrough. Five outboard convergent flaps are each pivotally supported on an outboard flap support. Five inboard convergent flaps are each pivotally supported on an inboard flap support. The inboard convergent flaps located between adjacent outboard convergent flaps are in sealing contact with the outboard flaps. A throat drive simultaneously rotates the outboard convergent flaps and the inboard convergent flaps around their respective supports.

Five outboard divergent flaps are universally secured to the aft end of the outboard convergent flaps, while five inboard divergent flaps are universally secured to the aft end of the inboard convergent flaps. Five V shaped overlapping external flaps surround the divergent flaps. A support link is pivotally secured to each external flap and to each outboard convergent or inboard convergent flap. A divergent drive positions the external flaps, and consequently the divergent flaps.

The static structure has a section with a spherical outer surface. The divergent drive has a divergent drive ring with a cylindrical inside surface. It surrounds the spherical portion of the static structure; the support link secured to the outer flaps is aligned with the center point of the spherical surface.

DESCRIPTION OF THE PREFERRED EMBODIMENT

Figure 1:
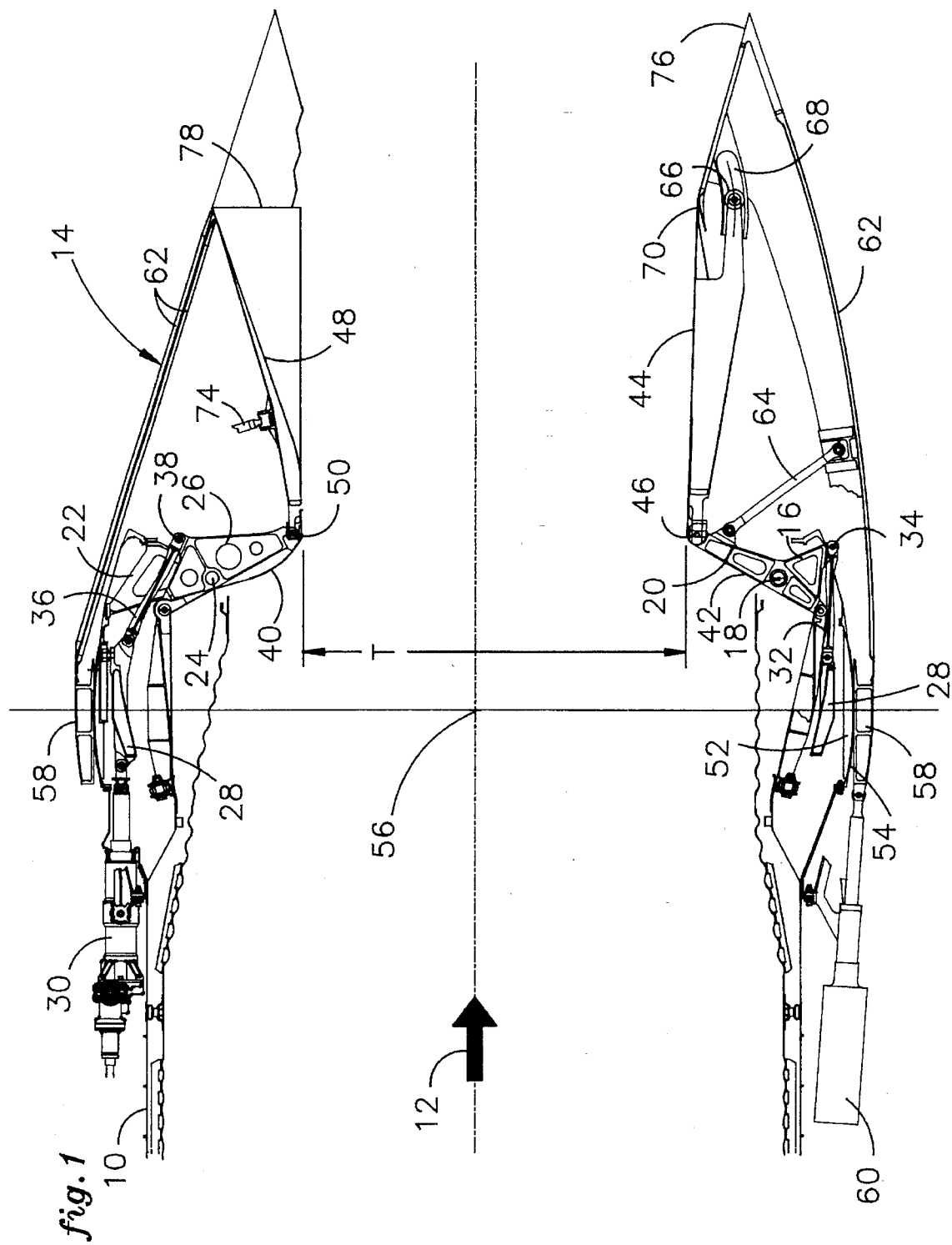
FIG. 1 is a side elevation showing the nozzle at a small throat condition.

Referring to FIG. 1 the static structure 10 carries an axial flow of gas 12 therethrough. The axisymmetric vectoring convergent/divergent nozzle 14 includes five outboard flap supports 16 each having a pivot point 18. Five outboard convergent flaps 20 are pivotally supported on the flap supports. Five inboard flap supports 22 having pivots 24 support five inboard convergent flaps 26.

The inboard convergent flaps 26 are located to bridge between two outboard convergent flaps 20 and are located in sealing contact therewith. They are located at the same place that conventionally designated seals are, with respect to the usual flaps of an axisymmetric nozzle. The seals of prior art however are loosely held into place and depend on the internal pressure to urge them against the flaps for sealing. Here however both the outboard convergent flaps and inboard convergent flaps are driven individually by drive links, and do not not depend on internal gas pressure for the sealing effect.

The size of the throat T is determined by the angular position of flaps 20 and 26 around their pivot points. A throat drive means includes the convergent unison ring 28 which is positioned axially by three actuators 30. An outboard drive link 32 is connected to outboard convergent flap 20 at drive point 34.

From the same unison ring 28, an inboard drive link 36 is connected to each inboard convergent flap 26 at drive point 38. The pivot points 18 and 24 are selected such that the inboard flap surface 40 of inboard flap 26 lies inboard of the outboard flap surface 42 of outboard flap 20. The pivot points are selected so such that the edges of each inboard convergent flap are maintained parallel to the surface of an adjacent outboard convergent flap throughout the range of movement, and such that the downstream end of each flap is in the same angular relationship with the divergent flaps downstream thereof discussed below.

Five outboard divergent flaps 44 are universally secured to the aft end of outboard convergent flaps 20 with a biaxial hinge 46. A plurality of inboard divergent flaps 48 are universally secured to the aft end of inboard convergent flaps 26 at the biaxial hinge 50. This permits appropriate movement of the divergent flaps with respect to the convergent flaps for vectoring of the nozzle.

The static structure has a spherical section 52 with the spherical outer surface 54. The centerpoint of this spherical surface is the centerpoint 56.

The divergent drive means includes a divergent drive ring 58 having a cylindrical inside surface. Under the influence of three actuators 60 this ring may be translated axially or rotated around centerpoint 56.

Secured to this ring by single axis hinges are five external flaps 62. Each flap is of a V shape and overlaps the adjacent external flap. Support link 64 is secured to the external flap between its ends, and also to the outboard convergent flap 20. The support link is located such that at an extension of the link passes through the centerpoint 56. This orientation of the support link substantially occurs throughout all of the non-vectoring operation. If ring 58 is rotated around centerpoint 56 to achieve vectoring, the external flaps 62 tend to rotate around that point also. The particular orientation of support link 64 permits this rotation.

The outboard divergent flaps 44 are guided from the external flap 62 by a pin 66 in slot 68. The slot 68 is curved so that opening 70 between the divergent flap and the external flap is maintained small throughout the operating range.

Each inboard divergent flap 48 located between adjacent outboard flaps 44 is supported by two links 74; each connected to an adjacent external flap 62. In the lower half of FIG. 1 the section is taken through the peak of the external flap where it extends aft to pointed end 76. In the upper half of the view the double thickness is shown, since the adjacent flaps are overlapping there, and they are shortened at this location so that they stop at the end 78 of the divergent flaps.

Figure 2:
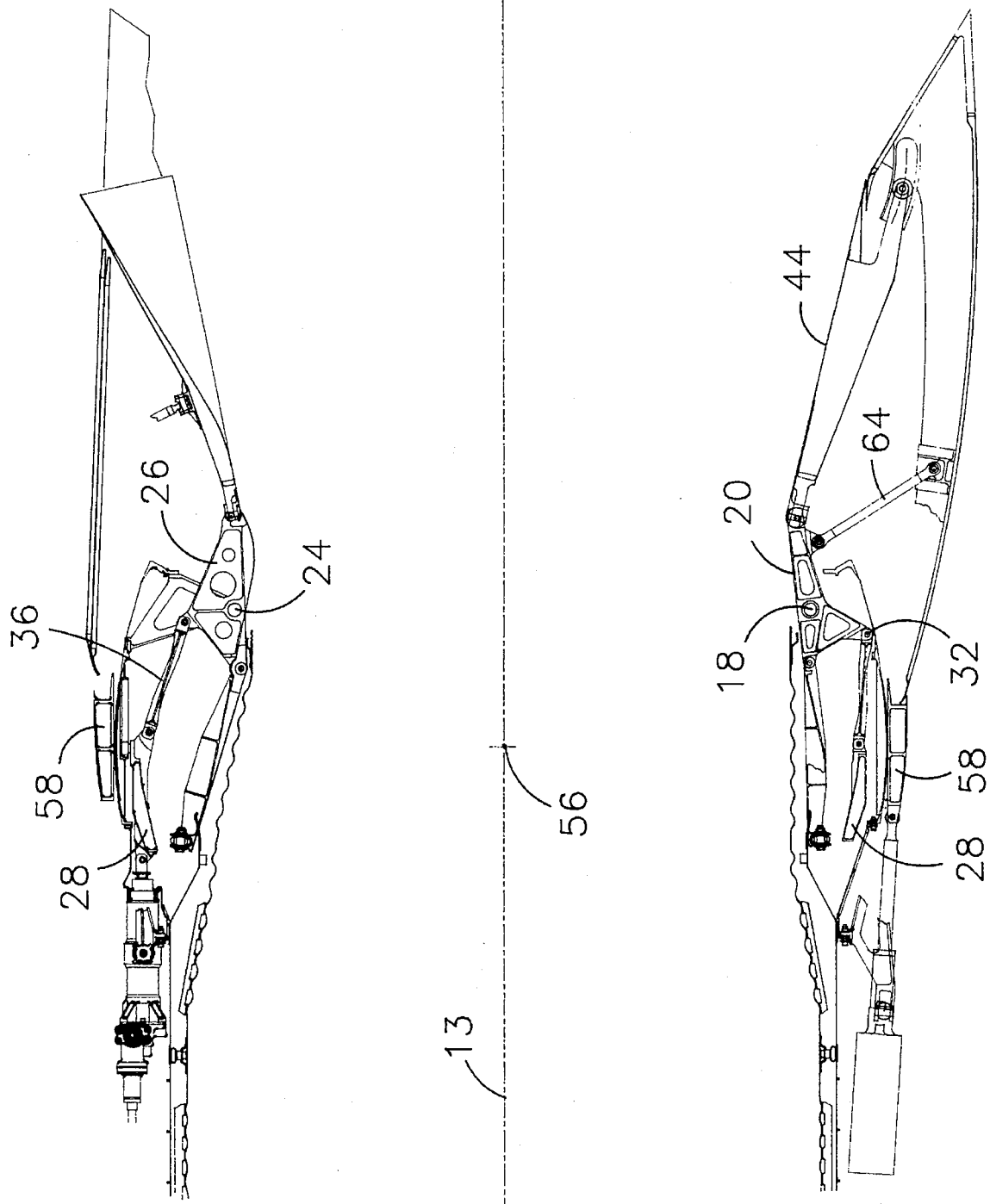
FIG. 2 is a side elevation showing the nozzle at a large throat condition.

FIG. 2 illustrates the nozzle in the large throat condition as required for afterburning. The convergent unison ring 28 has been moved forward pulling outboard convergent flap link 32. Outboard convergent flap 20 is rotated around pivot point 18 to achieve this open position.

In a similar manner this movement of the unison ring withdraws the inboard convergent flap link 36, rotating the inboard convergent flap 26 around pivot point 24.

The divergent unison ring 58 has been relocated to maintain support 64 at an angle passing through centerpoint 56. Divergent flaps 44 remain concentric with axis 13 for this non-vectored operation.

Figure 3:
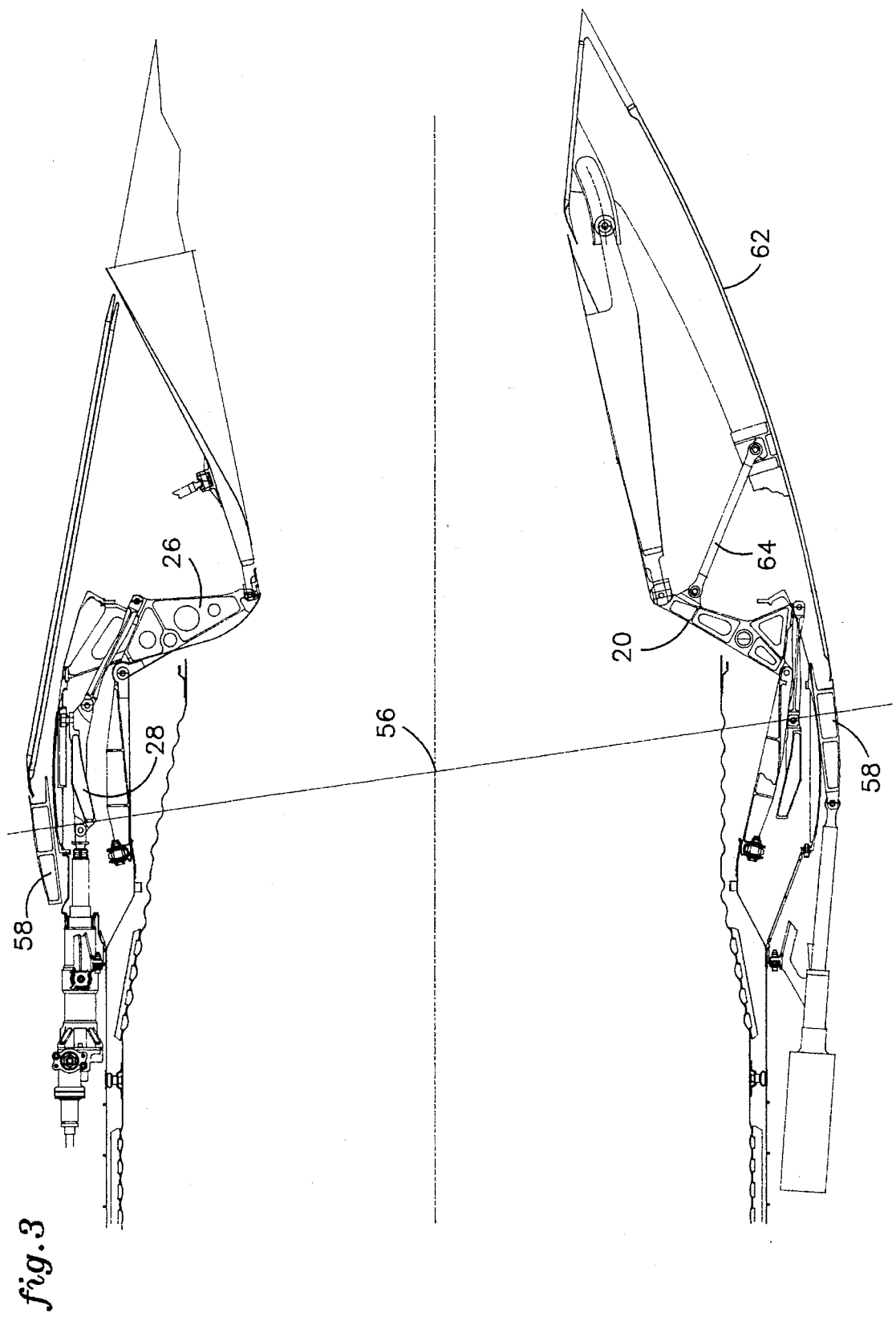
FIG. 3 is a side elevation showing the nozzle vectoring upwardly.

In FIG. 3 the convergent unison ring 28 remains in the position illustrated in FIG. 1. The inboard convergent flaps 26 and the outboard convergent flaps 20 therefore remain in the same position. The divergent flap unison ring 58 has been rotated around centerpoint 56 to achieve upward vectoring of the nozzle. Ideally the external flaps 62 would also rotate around centerpoint 56 with support link 64 continuing to point toward the center of rotation. This is not possible however and it can be seen that under the vectoring condition the link as illustrated here points forward of the centerpoint 56.

Figure 4:
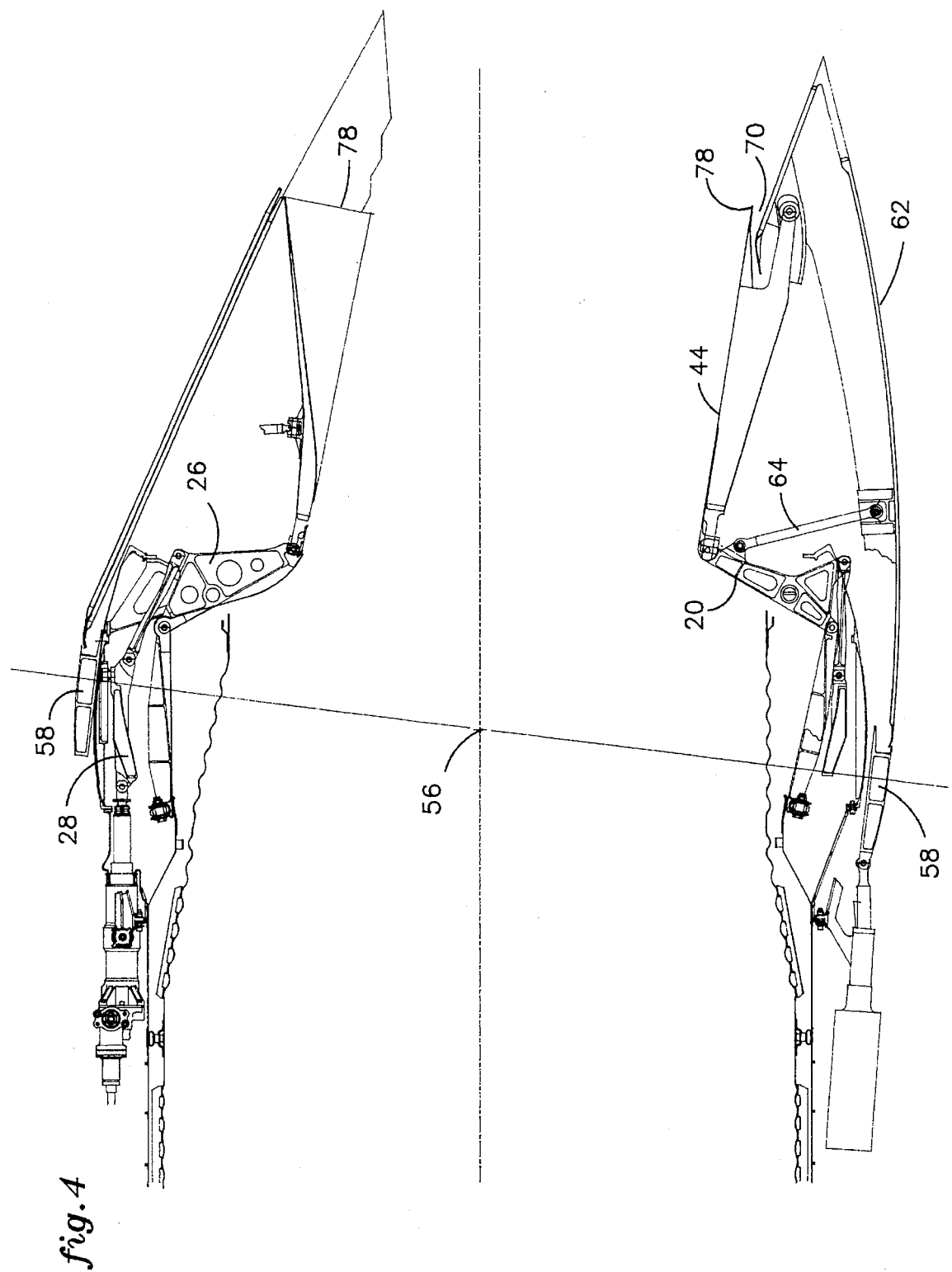
FIG. 4 is a side elevation showing the nozzle vectored downwardly.

FIG. 4 illustrates the vectoring in the opposite direction of FIG. 3. This actually is representative of what happens to the flaps in the upper portion of FIG. 3. It can be seen here that support strut 64 is now pointed aft of centerpoint 56. The symmetry of the external flap structure is maintained during vectoring, whereby appropriate overlap of the flaps is retained.

The arrangement is generically definable as having N inboard and outboard convergent flaps, N inboard and outboard divergent flaps and N external flaps. Preferably N is equal to five.

I claim:

1. An axisymmetric vectoring convergent/divergent nozzle for a gas turbine engine, comprising:

a static structure for axial flow of gas therethrough;

a plurality of outboard flap supports on said static structure;

a plurality of N outboard convergent flaps, each pivotally supported on one of said outboard flap supports;

a plurality of inboard flap supports on said static structure;

a plurality of N inboard convergent flaps, each pivotally supported on one of said inboard flap supports, said inboard convergent flaps located between adjacent outboard convergent flaps on the inboard side thereof in sealing contact therewith;

throat drive means for simultaneously rotating said outboard convergent flaps and said inboard convergent flaps around their respective supports;

a plurality of outboard divergent flaps universally secured to the aft end of said outboard convergent flaps;

a plurality of inboard divergent flaps universally secured to the aft end of said inboard convergent flaps;

a plurality of overlapping external flaps;

a plurality of support links, each support link pivotally secured to one of said external flaps at one end and pivotally secured to one of said outboard convergent flaps and inboard convergent flaps at the other end; and divergent drive means for positioning said external flaps.

2. An apparatus in claim 1 wherein:

the location at which said outboard convergent flap is pivotally supported on one of said outboard flap support comprises an outboard pivot point:

the location at which said inboard convergent flap is pivotally supported on one of said inboard flap support comprises an inboard pivot point;.

said pivot points are selected such that the edges of said inboard convergent flaps are maintained parallel to the surface of adjacent outboard convergent flaps throughout the range of movement; and the trailing edge of said inboard flaps and the trailing edge of said outboard flaps have the same angular relationship with said outboard divergent flaps secured to the aft end thereof.

3. An axisymmetric vectoring convergent/divergent nozzle for a gas turbine engine, comprising:

a static structure for axial flow of gas therethrough;

plurality of outboard flap supports On said static structure;

a plurality of N outboard convergent flaps, each pivotally supported on one of said outboard flap supports:

a plurality of inboard flap supports on said static structure;

a plurality of N inboard convergent flaps, each pivotally supported on one of said inboard flap supports, said inboard convergent flaps located between adjacent outboard convergent flaps on the inboard side thereof in sealing contact therewith:

throat drive means for simultaneously rotating said outboard convergent flaps and said inboard convergent flaps around their respective supports:

a plurality of outboard divergent flaps universally secured to the aft end of said outboard convergent flaps:

a plurality of inboard divergent flaps universally secured to the aft end of said inboard convergent flaps;

a plurality of overlapping external flaps:

a plurality of support links pivotally secured to one of said external flaps and to one of said outboard convergent and said inboard convergent flaps:

divergent drive means for positioning said external flaps: and said throat drive means comprising, a convergent unison ring surrounding said static structure, at least three actuators for axially positioning said convergent unison ring, an inboard flap link from said ring to each of said inboard convergent flaps and an outboard flap link from said ring to each of said outboard convergent flaps.

4. An apparatus as in claim 2 wherein:

the location of the connection between said outboard flap link and said outboard convergent flap and the connection between said inboard flap link and said inboard convergent flap are selected to maintain the surface of said inboard flaps parallel to the surface of adjacent outboard convergent flaps with the same motion of said convergent unison ring.

5. An apparatus as in claim 3 wherein:

said pivot points are selected such that the edges of said inboard convergent flaps are maintained parallel to the surface of adjacent outboard convergent flaps throughout the range of movement; and the trailing edge of said inboard flaps and the trailing edge of said outboard flaps have the same angular relationship with said divergent flap secured to the aft end thereof.

6. An apparatus as in claim 5 wherein:

the aft end of said divergent flaps are slidably pinned to the aft end of said external flaps.

7. An apparatus as in claim 6 wherein:

a slot located at the aft end of each external flap;

a pin located a the aft end of each divergent flap; and said slot curved to maintain on opening between the aft end of said divergent flaps and said external flaps.

8. An axisymmetric vectoring convergent/divergent nozzle for a gas turbine engine, comprising:

a static structure for axial flow of gas therethrough;

a plurality of outboard flap supports on said static structure;

a plurality of N outboard convergent flaps, each pivotally supported on one of said outboard flap supports;

a plurality of inboard flap supports on said static structure;

a plurality of N inboard convergent flaps, each pivotally supported on one of said inboard flap supports, said inboard convergent flaps located between adjacent outboard convergent flaps on the inboard side thereof in sealing contact therewith;

throat drive means for simultaneously rotating said outboard convergent flaps and said inboard convergent flaps around their respective supports;

a plurality of outboard divergent flaps universally secured to the aft end of said outboard convergent flaps;

a plurality of inboard divergent flaps universally secured to the aft end of said inboard convergent flaps;

a plurality of overlapping a plurality of support links pivotally secured to one of said external flaps and to one of said outboard convergent and said inboard convergent flaps;

divergent drive means for positioning said external flaps; and the aft end of said divergent flaps slidably pinned to the aft end of said external flaps.

9. An axisymmetric vectoring convergent/divergent nozzle for a gas turbine engine, comprising;

a static structure for axial flow of gas therethrough;

a plurality of outboard flap supports on said static structure;

a plurality of N outboard convergent flaps, each pivotally supported on one of said outboard flap supports:

a plurality of inboard flap supports on said static structure;

a plurality of N inboard convergent flaps, each pivotally supported on one of said inboard flap supports, said inboard convergent flaps located between adjacent outboard convergent flaps on the inboard side thereof in sealing contact therewith;

throat drive means for simultaneously rotating said outboard convergent flaps and said inboard convergent flaps around their respective supports;

a plurality of outboard divergent flaps universally secured to the aft end of said outboard convergent flaps;

a plurality of inboard divergent flaps universally secured to the aft end of said inboard convergent flaps;

a plurality of overlapping external flaps;

a plurality of support links pivotally secured to one of said external flaps and to one of said outboard convergent and said inboard convergent flaps;

divergent drive means for positioning said external flaps;

the aft end of said divergent flaps slidably pinned to the aft end of said external flaps:

a slot located at the aft end of each external flap;

a pin located at the aft end of each divergent flap; and said slot curved to maintain an opening between the aft end of said divergent flaps and said external flaps.

10. An axisymmetric vectoring convergent/divergent nozzle for a gas turbine engine, comprising:

a static structure for axial flow of gas therethrough;

a plurality of outboard flap supports on said static structure:

a plurality of N outboard convergent flaps, each pivotally supported on one of said outboard flap supports:

a plurality of inboard flap supports on said static structure;

a plurality of N inboard convergent flaps, each pivotally supported on one of said inboard flap supports, said inboard convergent flaps located between adjacent outboard convergent flaps on the inboard side thereof in sealing contact therewith;

throat drive means for simultaneously rotating said outboard convergent flaps and said inboard convergent flaps around their respective supports;

a plurality of outboard divergent flaps, universally secured to the aft end of said outboard convergent flaps:

a plurality of inboard divergent flaps universally secured to the aft end of said inboard convergent flaps:

a plurality of overlapping external flaps;

a plurality of support links pivotally secured to one of said external flaps and to one of said outboard convergent and said inboard convergent flaps:

divergent drive means for positioning said external flaps;

a center point located on a central axis through said static structure;

said divergent drive means including a divergent drive ring pivotable around said center point; and said support links located such that an extension of said links extends through said center point in the unvectored nozzle position.

11. An axisymmetric vectoring convergent/divergent nozzle for a gas turbine engine, comprising:

a static structure for axial flow of gas therethrough;

a plurality of outboard flap supports on said static structure;

a plurality of N outboard convergent flaps, each pivotally supported on one of said outboard flap supports;

a plurality of inboard flap Supports on said static structure;

a plurality of N inboard convergent flaps, each pivotally supported on one of said inboard flap supports, said inboard convergent flaps located between adjacent outboard convergent flaps on the inboard side thereof in sealing contact therewith:

throat drive means for simultaneously rotating said outboard convergent flaps and said inboard convergent flaps around their respective supports:

a plurality of outboard divergent flaps universally secured to the aft end of said outboard convergent flaps;

a plurality of overlapping external flaps;

a plurality of support links pivotally secured to one of said external flaps and to one of said outboard convergent and said inboard convergent flaps:

divergent drive means for positioning said external flaps:

a center point located on a central axis through said static structure;

said divergent drive means including a divergent drive ring pivotable around said center point;

said support links located such that an extension of said links extends through said center point in the unvectored nozzle position;

said static structure having a section with a spherical outer surface;

said divergent drive ring having a cylindrical inside surface and surrounding said spherical portion of said static structure; and the center of said spherical surface being said center point toward which said supports are aligned.

12. An apparatus as in claim 11 wherein:

the aft end of said divergent flaps are slidably pinned to the aft end of said external flaps.

13. An apparatus as in claim 12 wherein:

a slot located at the aft end of each external flap;

a pin located a the aft end of each divergent flap; and said slot curved to maintain an opening between the aft end of said divergent flaps and said external flaps.

* * * * *